No. 851,171. PATENTED APR. 23, 1907.
R. C. ISRAEL.
SEED PLANTING MEANS.
APPLICATION FILED MAR. 1, 1906. RENEWED SEPT. 17, 1906.
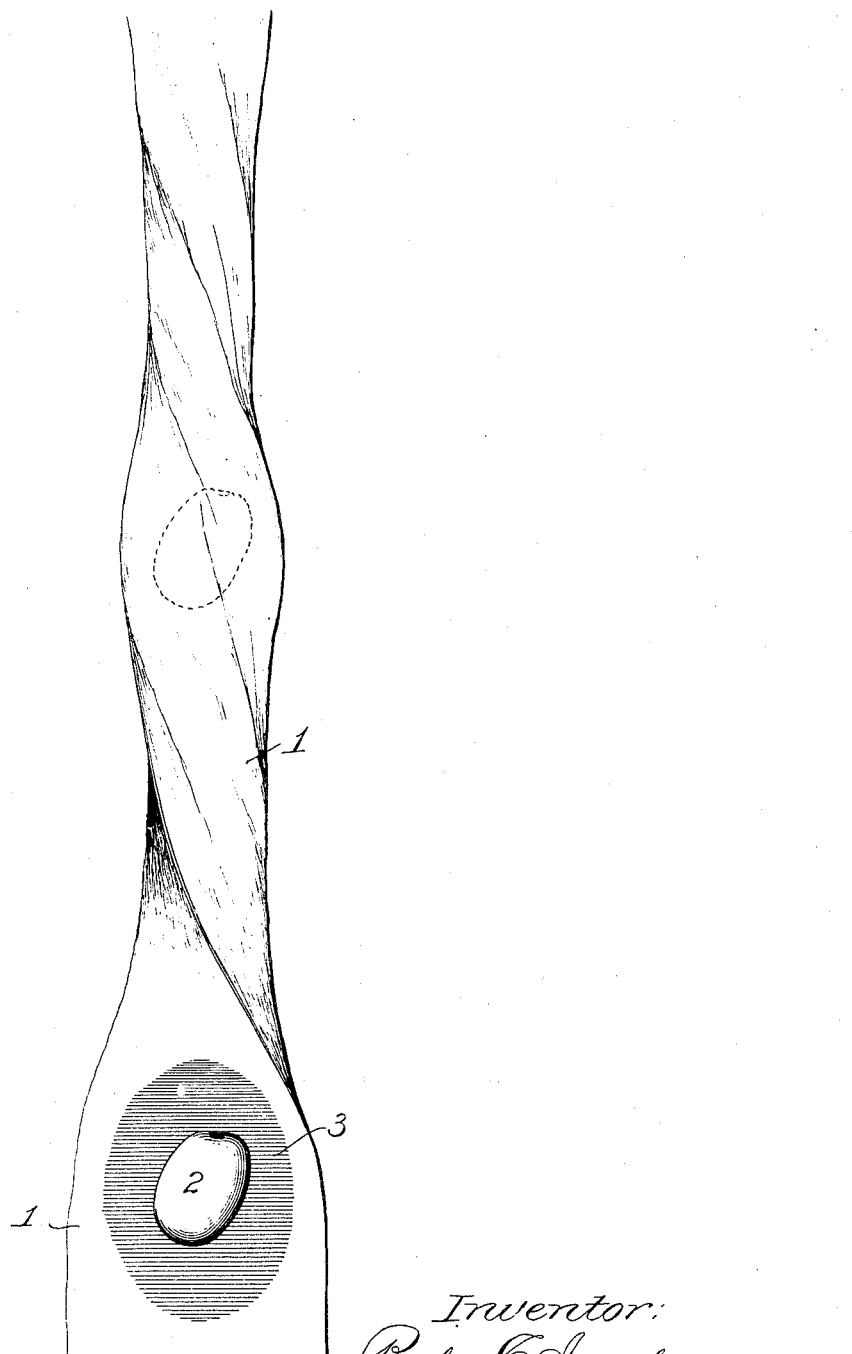
Attest:
John Enders
M. H. Holmes
Inventor:
Reuben C. Israel,
by Robert Burns
Attorney.

UNITED STATES PATENT OFFICE.

REUBEN C. ISRAEL, OF WICHITA, KANSAS.

SEED-PLANTING MEANS.

No. 851,171.  Specification of Letters Patent.  Patented April 23, 1907.

Application filed March 1, 1906. Renewed September 17, 1906. Serial No. 334,982.

*To all whom it may concern:*

Be it known that I, REUBEN C. ISRAEL, a citizen of the United States, and a resident of Wichita, in the county of Sedgwick and State of Kansas, have invented a certain new and useful Improvement in Seed-Planting Means, of which the following is a specification.

This invention relates to a method of preparing seeds for planting, wherein the seeds are enclosed at spaced intervals in a flexible holding strip of paper or the like; and the present improvement has for its object to provide means whereby the germination of seeds, arranged in the above mentioned manner, is insured in a very effective and certain manner; all as will hereinafter more fully appear.

The accompanying drawing is an elevation of a portion of a flexible seed carrying strip embodying the present invention, a portion of the strip being shown unfolded to better illustrate the arrangement of parts.

Referring to the drawing:—1 represents a narrow strip or band of paper or like cheap and pliable material, upon which the seeds 2 are placed in spaced relation, after which the margins of the strip are brought over the seeds to enclose the same by any usual folding or twisting of the strip.

The material part of the present invention involves in an arrangement substantially as above set forth, the provision of a layer, body or coating 3, of any usual and suitable fertilizing substance upon the strip 1, in adjacent relation to the seeds 2; and it is within the scope of the present invention to arrange such fertilizing material, as small individual layers or masses in contact with the seeds, as shown in the accompanying drawing, or to form a coating of the fertilizing material along the entire surface of the strip 1, or, again, to saturate said strip with a fertilizer in solution.

The merit of the present improvement lies in the fact that the fertilizer is in intimate contact, so that rapid and perfect germination of the seed is insured after the usual planting operation.

Having thus fully described my said invention, what I claim as new and desire to secure by Letters Patent, is:—

1. A seed planting means consisting of an elongated strip of pliable material, seeds in spaced relation enclosed therein, and a fertilizing material placed in adjacent relation to the seeds and carried by said strip.

2. A seed planting means consisting of an elongated strip of pliable material, seeds in spaced relation enclosed therein, and individual layers of fertilizing material placed in contact with said seeds and carried by said strip.

Signed at Oswego, Kansas, this 9th day of February, 1906.

REUBEN C. ISRAEL.

Witnesses Feby. 24, 1906:
  E. E. FORD,
  W. E. DUNAWAY.